US012645099B2

(12) United States Patent (10) Patent No.: US 12,645,099 B2
Yu et al. (45) Date of Patent: Jun. 2, 2026

(54) DOUBLE-SIDED COMPOUND SPECTACLE LENS AND PREPARATION MOLD THEREFOR

(71) Applicant: SUZHOU MASON OPTICAL CO., LTD., Suzhou (CN)

(72) Inventors: Haomo Yu, Suzhou (CN); Xiaoyi Chen, Suzhou (CN); Tao Feng, Suzhou (CN); De Li, Suzhou (CN)

(73) Assignee: SUZHOU MASON OPTICAL CO., LTD., Suzhou (CN)

( * ) Notice: Subject to any disclaimer, the term of this patent is extended or adjusted under 35 U.S.C. 154(b) by 254 days.

(21) Appl. No.: 18/402,845

(22) Filed: Jan. 3, 2024

(65) Prior Publication Data

US 2024/0134210 A1 Apr. 25, 2024
US 2024/0231125 A9 Jul. 11, 2024

Related U.S. Application Data

(63) Continuation of application No. PCT/CN2022/079337, filed on Mar. 4, 2022.

(51) Int. Cl.
*G02C 7/02* (2006.01)
*G02B 1/04* (2006.01)
(52) U.S. Cl.
CPC ............. *G02C 7/022* (2013.01); *G02B 1/041* (2013.01)
(58) Field of Classification Search
CPC .......... G02C 7/022; G02C 7/024; G02C 7/06; G02C 7/068
(Continued)

(56) References Cited

U.S. PATENT DOCUMENTS 3,623,800 A * 11/1971 Volk ...................... B24B 13/065
351/159.21
3,950,082 A * 4/1976 Volk ...................... G02C 7/061
351/159.41
(Continued)

FOREIGN PATENT DOCUMENTS

CN 102419482 A 4/2012
CN 104375281 A 2/2015
(Continued)

OTHER PUBLICATIONS

International Search report received for PCT Patent Application No. PCT/CN2022/079337, mailed on May 24, 2022, 8 pages including English translation.
(Continued)

*Primary Examiner* — Bumsuk Won
*Assistant Examiner* — Seth D Moser
(74) *Attorney, Agent, or Firm* — Zhong Law, LLC

(57) ABSTRACT

A double-sided composite spectacle lens and an inject mold therefor are provided. One surface of the spectacle lens is an aspherical surface, and the other surface is a designed aspherical surface used to inhibit astigmatism, and a spectacle lens formed by combining the two surfaces has two areas with different functions: optimizing optical performance, and thinning for aesthetics. By controlling the reduction of diopter and optimizing astigmatism on one surface, and inversely offsetting astigmatism on the other surface, the degree of astigmatism of the spectacle lens formed by combining the two surfaces is significantly lower than a diopter variation, and the degree of oblique astigmatism is significantly reduced. The aesthetic thinning effects of reducing the edge or center thickness of the double-sided composite spectacle lens are significantly enhanced by accelerating reduction of the diopter on one surface and (Continued)

Myopic lens

Spherical face changing from reducing to increasing the diopter on the other surface.

8 Claims, 10 Drawing Sheets

(58) Field of Classification Search
USPC .......................... 351/159.42, 159.46, 159.47
See application file for complete search history.

(56) References Cited

U.S. PATENT DOCUMENTS

| | | | | | |
|---|---|---|---|---|---|
| 5,353,072 | A | * | 10/1994 | Tejima ...................... | G02C 7/02 351/159.01 |
| 10,663,764 | B2 | * | 5/2020 | Meschenmoser ............................ | B29D 11/00028 |
| 2004/0233385 | A1 | * | 11/2004 | Kitani .................... | G02C 7/063 351/159.42 |
| 2005/0068493 | A1 | * | 3/2005 | Menezes ................ | G02C 7/028 351/159.42 |
| 2008/0143959 | A1 | * | 6/2008 | Bourdoncle ........... | G02C 7/061 351/159.42 |
| 2010/0238400 | A1 | * | 9/2010 | Volk ........................ | G02C 7/061 156/60 |
| 2010/0245758 | A1 | * | 9/2010 | Lytle ...................... | G02C 7/063 351/159.74 |
| 2014/0016088 | A1 | * | 1/2014 | De Rossi ............... | G02C 7/021 351/159.77 |

FOREIGN PATENT DOCUMENTS

| | | | |
|---|---|---|---|
| CN | 105137611 | A | 12/2015 |
| CN | 106444073 | A | 2/2017 |
| CN | 208721922 | U | 4/2019 |
| CN | 110275317 | A | 9/2019 |
| CN | 210136372 | U | 3/2020 |
| CN | 210573061 | U | 5/2020 |
| CN | 211478794 | U | 9/2020 |
| JP | 2018077401 | A | 5/2018 |

OTHER PUBLICATIONS

Written Opinion of the International Searching Authority received for PCT Patent Application No. PCT/CN2022/079337, mailed on May 24, 2022, pages including English translation.
First notice of examination opinions for CN Application No. 202110753392, dated Oct. 20, 2022.

* cited by examiner

Diopter (D)

(a)

Degree of astigmatism (D)

(b)

(a)     (b)

DOUBLE-SIDED COMPOUND SPECTACLE LENS AND PREPARATION MOLD THEREFOR

CROSS-REFERENCE TO RELATED APPLICATIONS

This application is a continuation of PCT/CN2020/079337 filed Mar. 4, 2022, which claims priority benefit to Chinese Patent Application No. CN 202110753392.2 filed Jul. 3, 2021. The contents of the above-mentioned applications are incorporated by reference in their entirety.

TECHNICAL FIELD

The present disclosure relates to a double-sided compound or composite spectacle lens (referred to as "composite spectacle lens" hereinafter), and in particular, to a double-sided composite spectacle lens capable of and taking account of effects of oblique astigmatism optimization, and lightening and thinning, and a preparation or inject mold (referred to as "inject mold" hereinafter) therefor.

BACKGROUND

Although a spectacle lens is designed and manufactured as a single unified surface, there are functional differences in the usage of various regions of the spectacle lens during actual use. Within a 35 degree angle of view for a lens wearer, on the corresponding lens, a central viewing area is within a range of an aperture of 20 mm and is directly related to clarity of a front viewed object and adaptability of wearing glasses. A range between the aperture of 20 mm to 50 mm represents an oblique viewing area. The magnitude of image distortion in this area is related to the peripheral visual effects for the wearer, impacting the comfort and adaptability of wearing glasses. A thickness control area ranges from the aperture of 50 mm to the lens edge, and the design requirement of the thickness control area is to achieve an aesthetic, thin, and light lens. Neither existing aspherical lens nor double-sided aspherical lens have t incorporated a clear zoning concept for optical performance and thinning functionality. For example, considering the overall optical performance in designing aspherical lenses makes it challenging to achieve a balance between optical quality and the desire for a slim and aesthetically pleasing appearance. When a double-sided aspherical lens is designed, the degree of astigmatism gradually increases as the design thickness of the lens decreases, and the aesthetic and thin effects are achieved usually at the cost of sacrificing a part of the surrounding visual effect. Moreover, in the current technology, the aspherical lenses produced in batch through mold casting are designed based on theoretical values of imaging parallel light onto the spherical surface of the retina. When the eyeglass frame of the wearer deviates from a theoretical design position, such aspherical lens usually causes discomfort because of deviation of compensatory astigmatism. In severe cases, the comfort level may even be inferior to that of spherical lenses.

For a conventional double-sided aspherical lens with astigmatism, variations of diopter compensation of the aspherical surface in all directions are even. In one aspect, a risk of being not prone to adapt is caused because of the cumulative effect of ATORIC. On the other hand, the inherent thickness disparity at the edges of astigmatic lenses is not effectively addressed.

SUMMARY

In view of the deficiency in the current technology, the present disclosure provides a double-sided composite spectacle lens, which is formed by compounding and matching two surfaces, has an optical performance area and an aesthetic thinning area clearly divided, and is optimally designed to maintain sufficient comfort and adaptability to wear under the premise of being lighter, thinner, and flatter than a conventional aspherical lens since an astigmatism variation of an oblique viewing area is significantly lower than a diopter variation and a thickness control area achieves flat and thin effects of the spectacle lens, and an inject mold therefor.

The technical solution adopted for achieving the object of the present disclosure is to provide a double-sided composite spectacle lens. The spectacle lens is a double-sided compound aspherical spectacle lens, with one surface being aspherical surface P and the other being an aspherical surface W, where the central curvature of surface P is smaller than that of surface W.

An absolute value of a diopter of the spectacle lens decreases gradually from a center to a periphery of the spectacle lens, and an absolute value of a diopter variation of the spectacle lens is 0.10-0.20 times of the absolute value of the diopter of the center of the spectacle lens at an aperture of 40 mm of the spectacle lens; a difference between the absolute value of the diopter variation and a degree of astigmatism of the spectacle lens increases gradually from the center to the periphery of the spectacle lens; the degree of astigmatism of the spectacle lens is less than the absolute value of the diopter variation of the spectacle lens at each point of the spectacle lens, the degree of astigmatism of the spectacle lens is less than 0.80 times of the absolute value of the diopter variation of the spectacle lens at the aperture of 30 mm of the spectacle lens, and the degree of astigmatism of the spectacle lens is less than 0.68 times of the absolute value of the diopter variation of the spectacle lens at the aperture of 50 mm of the spectacle lens.

A diopter of the surface P decreases at a uniform speed and then increase from the center to the periphery with an inflection point occurring in the aperture of 52-56 mm, and the degree of astigmatism of the surface P is greater than 1.05 times of the absolute value of the diopter variation of the surface P at the aperture of 30 mm.

A variation rate of the diopter of the surface W is greater than the variation rate of the diopter of the surface P. The diopter of the surface W decreases gradually at a uniform speed from the center to the aperture of 50 mm. A decrease rate of the diopter of the surface W increases from the aperture of 50 mm to the periphery. The absolute value of the diopter variation of the surface W along rotation radius at the aperture of 40 mm is 0.10-0.20 times of the diopter of the center of the surface W.

The degree of astigmatism of the surface W is less than the absolute value of the diopter variation of the surface W at each point of the surface W, the degree of astigmatism of the surface W is less than 0.85 times of the absolute value of the diopter variation of the surface W at the aperture of 30 mm, and the degree of astigmatism of the surface W is less than 0.72 times of the absolute value of the diopter variation of the surface W at the aperture of 50 mm.

In the double-sided composite spectacle lens according to the present disclosure, a double-sided compound aspherical myopic spectacle lens is formed by using the aspherical surface P as a front surface and the aspherical surface W as a back surface. Alternatively, a double-sided compound aspherical hyperopic spectacle lens is formed by using the aspherical surface W as a front surface and the aspherical surface P as a back surface.

A mold for preparing the double-sided composite spectacle lens is provided. The mold is a glass mold for casting a resin lens. The mold comprises a concave die holder having an aspherical surface P as a working surface and a convex die holder having an aspherical surface W as a working surface. Alternatively, the mold comprises a concave die holder having an aspherical surface W as a working surface and a convex die holder having an aspherical surface P as a working surface.

According to the technical solution of the present disclosure, a double-sided composite spectacle lens is also provided. The spectacle lens is a double-sided compound astigmatic spectacle lens having an aspherical surface and an atoric surface. A center curvature of the aspherical surface is less than that of the atoric surface.

An absolute value of a diopter of the spectacle lens decreases gradually from a center to a periphery of the spectacle lens; an absolute value of a diopter variation of the spectacle lens in a cylindrical lens direction is 0.10-0.20 times of the absolute value of the diopter of the center of the spectacle lens in the cylindrical lens direction at an aperture of 40 mm of the spectacle lens, the absolute value of the diopter variation of the spectacle lens in a spherical lens direction (or base radius direction) is 0.09-0.18 times of the absolute value of the diopter of the center of the spectacle lens in the spherical lens direction, and the absolute value of the diopter variation of the spectacle lens in the spherical lens direction is lower than 0.9 times of the absolute value of the diopter variation of the spectacle lens in the cylindrical lens direction (or rotation radius direction).

An astigmatism variation of each point of the spectacle lens is less than the absolute value of the diopter variation. The astigmatism variation is less than 0.8 of the absolute value of the diopter variation at the aperture of 30 mm of the spectacle lens. The astigmatism variation is less than 0.68 of the absolute value of the diopter variation at the aperture of 50 mm of the spectacle lens. A surface diopter of the aspherical surface decreases at a uniform speed and inflects to increase within an aperture of 52-56 mm from the center to the periphery. The degree of astigmatism is greater than 1.05 of the absolute value of the diopter variation at the aperture of 30 mm. A diopter of the aspherical surface decreases at a uniform speed and then increase from the center to the periphery with an inflection point occurring in the aperture of 52-56 mm, and the degree of astigmatism of the aspherical surface is greater than 1.05 times of the absolute value of the diopter variation of the aspherical surface at the aperture of 30 mm.

A rate of variation of the diopter of the atoric surface is greater than that of the diopter of the aspherical surface, the diopter of the atoric surface decreases at a uniform speed from the center to the aperture of 50 mm, and a decrease rate of the diopter of the atoric surface increases from the aperture of 50 mm to the periphery; and at an aperture of 40 mm, the absolute value of the diopter variation of the atoric surface in the cylindrical lens direction is 0.10-0.20 times of the diopter of the center of the atoric surface in the cylindrical lens direction, the absolute value of the diopter variation of the atoric surface in the spherical lens direction is 0.09-0.18 times of the absolute value of the diopter of the center of the atoric surface in the spherical lens direction, and the absolute value of the diopter variation of the atoric surface in the spherical lens direction is lower than 0.9 times of the absolute value of the diopter variation of the atoric surface in the cylindrical lens direction.

An astigmatism variation of the atoric surface is less than the absolute value of the diopter variation of the atoric surface at each point of the atoric surface, the astigmatism variation of the atoric surface is less than 0.85 times of the absolute value of the diopter variation of the atoric surface at the aperture of 30 mm, and the astigmatism variation of the atoric surface is less than 0.72 times of the absolute value of the diopter variation of the atoric surface at the aperture of 50 mm.

In the double-sided compound astigmatic spectacle lens, a double-sided compound astigmatic myopic spectacle lens is formed by using the aspherical surface as a front surface and the atoric surface as a back surface. A double-sided compound astigmatic hyperopic spectacle lens is formed by using the atoric surface as a front surface and the aspherical surface as a back surface.

A mold for preparing the double-sided compound astigmatic spectacle lens is provided. The mold is a glass mold for casting a resin lens. The mold comprises a concave die holder having an aspherical surface as a working surface and a convex die holder having an atoric surface as a working surface. Alternatively, the mold comprises a concave die holder having an atoric surface as a working surface and a convex die holder having an aspherical surface as a working surface.

In the present disclosure, the diopter of each point of the spectacle lens is an average value between a maximum diopter value and a minimum diopter value of this point of the spectacle lens in different directions. The diopter variation of each point of the spectacle lens is a diopter value of this point of the spectacle lens minus a diopter value of the center of the lens. The diopters of the surface P and the surface W are an average value of two principal curvatures of a certain point on the surface multiplied by a refractive index of a lens material minus 1. The principal curvatures are greater than zero and are positive diopter values.

In the present disclosure, the cylindrical lens direction of each point of the astigmatic lens and the atoric surface is a direction corresponding to a maximum absolute value of the diopter at the center, and the diopter value in this direction is the diopter of this point in the cylindrical lens direction. The spherical lens direction of each point of the astigmatic lens and the atoric surface is a direction corresponding to a minimum absolute value of the diopter at the center, and the diopter value in this direction is the diopter in the spherical lens direction. The cylindrical lens direction is perpendicular to the spherical lens direction. An average value between the diopter in the cylindrical lens direction and the diopter in the spherical lens direction is the diopter value of this point.

According to the technical solution of the present disclosure, the myopic spectacle lens is formed by using the surface with a small curvature as a front surface and the surface with a large curvature as a back surface, and has a negative diopter. From the center to the periphery, the absolute value of the diopter decreases, and the negative diopter is reduced. The hyperopic spectacle lens is formed by using the surface with a large curvature as a front surface and the surface with a small curvature as a back surface, and has a positive diopter. From the center to the periphery, the diopter decreases, and the positive diopter is reduced.

Based on the design concept of area dividing, the lens of the present disclosure is divided into a central viewing area within the aperture of 20 mm, an oblique astigmatism optimization area within the aperture of 20-50 mm, and an aesthetic thinning control area between the aperture of 50 mm and the periphery. By using the double-sided compound aspherical spectacle lens provided by the present disclosure, a ray trace is calculated according to default values that a lens-to-eye distance is 12 mm, a distance between the spherical surface at a far point of a retina and a vertex of an eyeball is 13 mm, and a vertical inclination angle of an eyeglass frame is 9 degrees, the oblique astigmatism, astigmatism, and field curvature of the double-sided compound aspherical spectacle lens within an angle of view of 35 degrees are better than those of a spherical lens formed by the same material and the same center diopters of the front and back surfaces.

Compared with the current technology, the present disclosure has the following beneficial effects.

1. Based on the design concept of area dividing, the lens of the present disclosure is divided into the central viewing area within the aperture of less than 20 mm and the oblique viewing area for the astigmatism within the aperture of 20-50 mm. The two areas ensure clarity and comfort for both direct and oblique viewing. The area from the aperture of 50 mm to the lens edge by cutting down the edge thickness value (ETVA) is designated as the slimming functionality zone, aiming to reduce the thickness at the edges or center of the lens. The designed lens has clear functions in each area, offering excellent optical performance and visual effects while maintaining a light and thin appearance.

2. The front and back surfaces of the lens are aspherical surfaces with specific requirements. The relatively flat surface P is gradually flattened from the center to the periphery, and the relatively curved surface is gradually flattened from the center to the periphery at a rate far greater than the surface P, so that the edge of the formed myopic spectacle lens is thinned, and the edge of the formed hyperopic spectacle lens is thickened and the center thickness of the formed hyperopic spectacle lens can be reduced, and the effect of lightness and thinness of the lens is achieved.

3. The front and back surfaces of the lens are gradually flattened from the center to the periphery. Assuming that both surfaces have positive diopters, the diopters decrease so that a sagittal diopter is greater than a meridian diopter from the center to the periphery. Therefore, the degrees of astigmatism of the front and back surfaces caused by the diopter variation are in the same direction. The subtraction of astigmatism values between the front and back surfaces buffers each other, reducing astigmatism in the visual function area.

4. The front and back surfaces of the lens are gradually flattened from the center to the periphery, which is actually not conducive to the lens's slimming functionality. In order to overcome this weakness, the surface P (relatively flat) with a small curvature is specially designed to have an inflection point in the aesthetic thinning area (at an aperture of 52-56 mm), and after the inflection point, the diopter gradually increases to make up for the influence on the aesthetic thinning of the lens caused by the decrease of the diopter.

5. The degree of astigmatism of the specially designed aspherical surface P is greater than 1.05 times of the diopter variation at the aperture of 30 mm, and a large astigmatism value can be subtracted when the surface P is combined with the surface W into the lens, thus increasing the function of easing astigmatism.

6. The degree of astigmatism of the surface W of the lens is less than the diopter variation of the surface W. The degree of astigmatism of the surface W is less than 0.85 times of the diopter variation of the surface W at the aperture of 30 mm, and the degree of astigmatism of the surface W is less than 0.72 times of the diopter variation of the surface W at the aperture of 50 mm. After astigmatism offsetting with the surface P, the degree of astigmatism of the formed lens is less than 0.8 times of the diopter variation of the formed lens at the aperture of 30 mm of the formed lens, and the degree of astigmatism of the formed lens is less than 0.68 times of the diopter variation of the formed lens at the aperture of 50 mm, thus ensuring good clarity and comfort of the front object viewing area and the oblique viewing area.

7. When the lens is designed, astigmatism optimization based on theory in which parallel light is incident and imaged is carried out, and aberration optimization such as oblique astigmatism and field curvature of eyeglasses made of lenses and worn by wearers is also taken into consideration, thus ensuring a clear visual effect and good comfort to the wearers within an angle of view of 35 degrees.

8. One surface of the spectacle lens with astigmatism provided by the present disclosure is the atoric surface having a gradually decreasing diopter, and the other surface of the spectacle lens is the specially designed aspherical surface used to ease astigmatism. The decrease of the diopter of the atoric surface in a spherical lens direction is lower than 90% of the decrease of the diopter of the atoric surface in a cylindrical lens direction at the aperture of 40 mm, thus reducing a thickness difference in the spherical lens direction and the cylindrical lens direction. Also, a risk of being not prone to adapt can be reduced by reducing a part of the diopter variation value of the astigmatic lens and using an overall conservative aspherical compensation value.

DESCRIPTION OF EMBODIMENTS

Embodiments

The technical solution of the present disclosure will be further described below in conjunction with the accompanying drawings and embodiments.

Embodiment 1

A lens provided in this embodiment is a −6.00D double-sided aspherical myopic lens having a surface P with a small curvature and a center diopter of 0.75D as a front surface and a surface W with a large curvature and a center diopter of 6.75D as a back surface. The lens has a refractive index of 1.56 and a center thickness of 1.2 mm.

In this embodiment, an aspherical surface is designed by using a global search optimal solution method combining a pattern search method and genetic algorithm. Both the surfaces P and W are aspherical surfaces with even higher-order terms. A surface vector height is determined by the following function formula (1):

$$Z(r) = \frac{Cr^2}{1 + \sqrt{1 - C^2(1+k)r^2}} + \sum_{m=2}^{8} a_{2m} r^{2m} \tag{1}$$

wherein r is a radial position coordinate of the lens; C is a center curvature of the aspherical surface; k is a cone coefficient of the aspherical surface; and $a_{2m}$ m=2, 3 . . . 8 is a higher-order term coefficient of the aspherical surface. According to formula (1), formulas of principal curvatures $K_t$ and $K_s$ of a rotationally symmetric aspherical surface (even aspherical surface)

are derived from the principle of differential geometry. A meridian principal curvature $K_t$ is a curvature of a sectional curve between a meridian surface and the aspherical surface, along a radial direction. A sagittal principal curvature $K_s$ is a curvature of a sectional curve between a sagittal surface and the aspherical surface, along a direction perpendicular to the radial direction.

At a radial position r, an average curvature $\overline{K}(r)=K_s(r)+K_t(r))/2$, a diopter is Power (r)=(n−1)$\overline{K}$(r), and astigmatism is Cylinder(r)=(n−1)|$K_s$(r)−$K_t$(r)|, where n represents a refractive index of a lens material.

Figures 1, 2, 3:
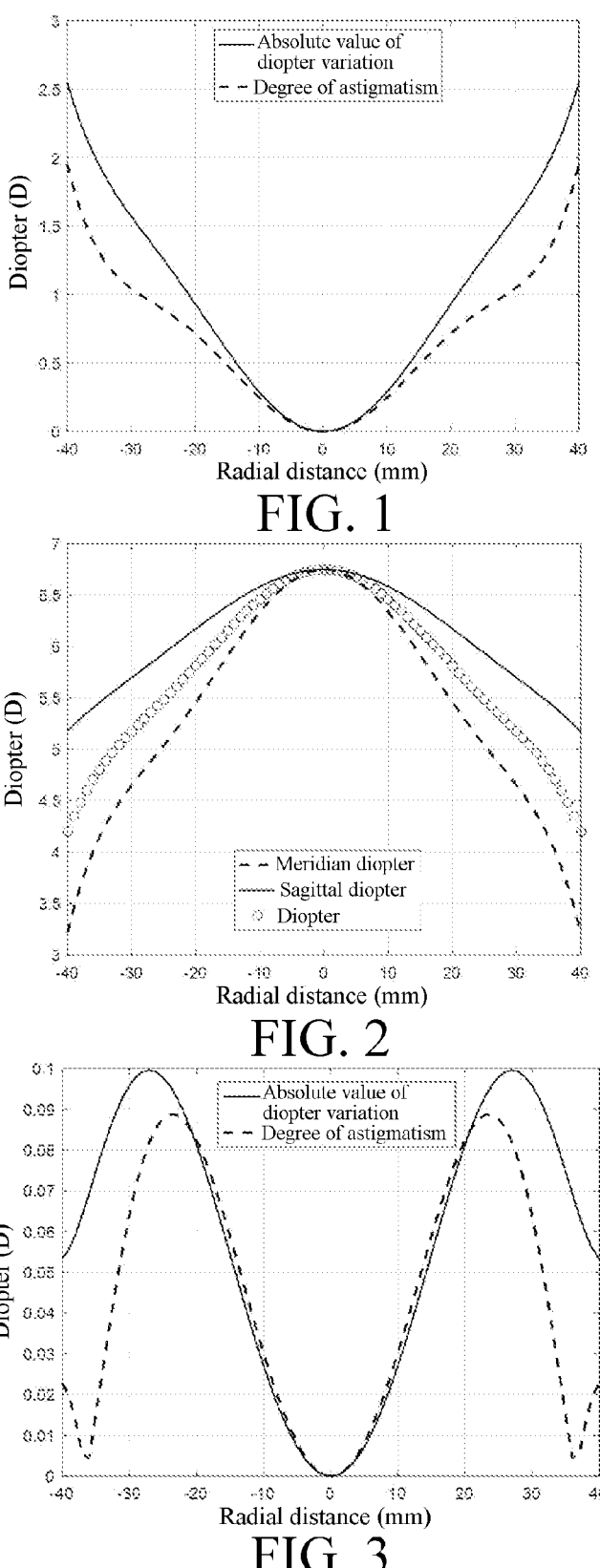
FIG. 1 is a radial variation curve graph of an absolute value of a diopter variation and a degree of astigmatism of a surface W according to Embodiment 1 of the present disclosure.
FIG. 2 shows a radial variation curve graph of a meridian diopter, a sagittal diopter, and a diopter of the surface W according to Embodiment 1 of the present disclosure.
FIG. 3 is a radial variation curve graph of an absolute value of a diopter variation and a degree of astigmatism of a surface P according to Embodiment 1 of the present disclosure.

A center curvature C of the surface W (back surface) is set as C=6.751(1.56−1)=12.054 $m^{-1}$. In this embodiment, an absolute value of a diopter variation at an aperture of 40 mm of the surface W is 0.10-0.20 times of the diopter of the center of the surface W, and the diopter value of the surface W at the aperture of 40 mm is set to be 5.90D (0.85D lower than the diopter of the center, and the variation is 0.126 times of the diopter of the center). The diopter variation features of the surface W are as follows: the diopter decreases at a uniform speed from the center to an aperture of 50 mm, and a decrease rate of the diopter increases from the aperture of 50 mm to the periphery. In this embodiment, the diopter value is set every 5 mm along the r direction. The derived formulas of $K_t$ and $K_s$ and the diopter Power (r) calculated therefrom equal to a set value are used as nonlinear multi-constraint conditions of the pattern search method. Minimum full-aperture astigmatism Cylinder(r) is used as an objective function, and optimal solutions of the cone coefficient k of the aspherical surface and the higher-order term coefficient $a_{2m}$ m=2, 3 . . . 8 of the aspherical surface are searched by using the pattern search method to obtain a radial variation curve of the absolute value of the diopter variation and the degree of astigmatism of the surface W as shown in FIG. 1. The diopter value at the aperture of 40 mm minus the diopter of the center is the diopter variation, which is negative. The absolute value thereof is 0.9354D, which is 0.139 times of the diopter of the center. The diopter decreases rapidly from the aperture of 50 mm to the edge. The degree of astigmatism is less than the diopter variation. At an aperture of 30 mm, the diopter variation is 0.5946D, and the degree of astigmatism of 0.4841D is 0.814 times of the diopter variation and is less than 0.85. At the aperture of 50 mm, the diopter variation is 1.263D, and the degree of astigmatism of 0.8956D is 0.709 times of the diopter variation and is less than 0.72. These values conform to the design features of the surface W. FIG. 2 shows a radial variation curve of a meridian diopter, a sagittal diopter, and a diopter of the surface W. The diopter of the center is 6.75. The diopter decreases from the center to the periphery, and decreases rapidly beyond the aperture of 50 mm. The sagittal diopter of the surface is greater than the meridian diopter, which indicates that an astigmatism axial direction of the surface W is a sagittal direction.

Figures 4, 5, 6:
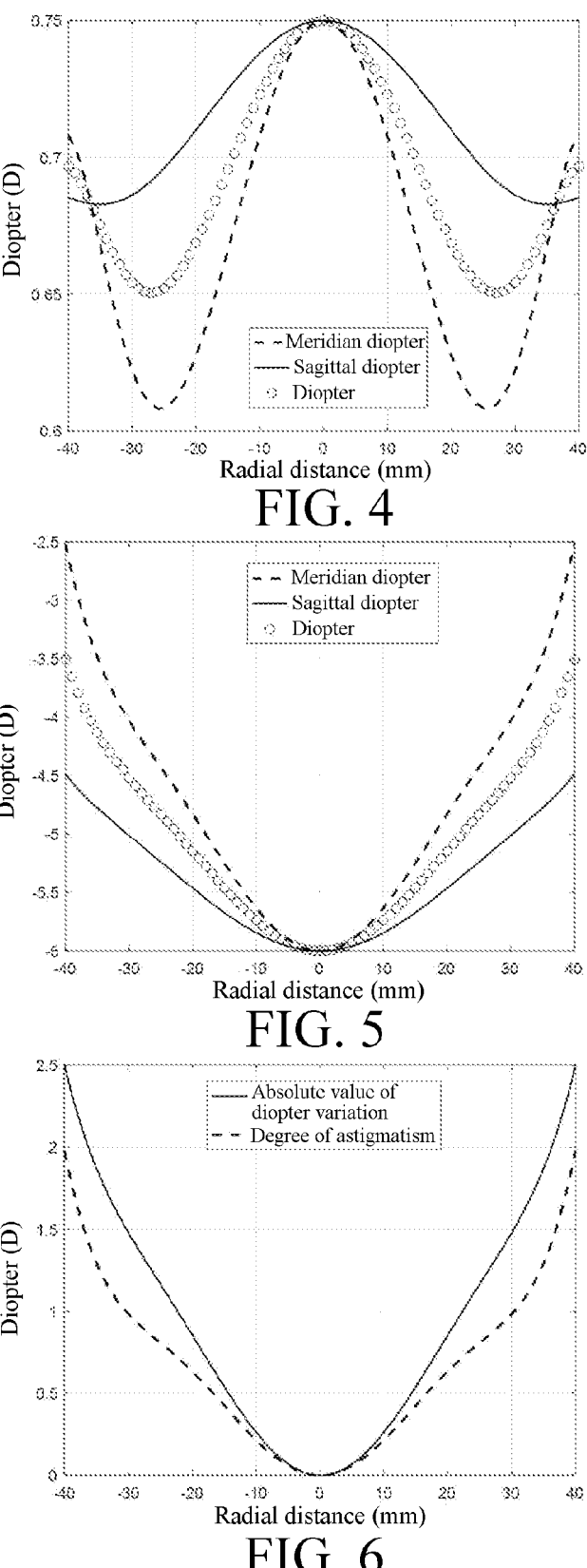
FIG. 4 shows a radial variation curve graph of a meridian diopter, a sagittal diopter, and a diopter of the surface P according to Embodiment 1 of the present disclosure.
FIG. 5 shows a radial variation curve graph of a meridian diopter, a sagittal diopter, and a diopter of a double-sided compound aspherical myopic lens according to Embodiment 1 of the present disclosure.
FIG. 6 is a radial variation curve graph of a diopter variation and the degree of astigmatism of a double-sided compound aspherical myopic lens according to Embodiment 1 of the present disclosure.

A center curvature C of the surface P (front surface) is set as C=0.75/(1.56−1)=1.339 $m^{-1}$. The surface diopter of the surface P decreases at a uniform speed and then increase from the center to the periphery with an inflection point occurring in the aperture of 52-56 mm. The variation features of the diopter in which the degree of astigmatism is greater than 1.05 times of the absolute value of the diopter variation at the aperture of 30 mm are as follows: the diopter value is set every 5 mm along the r direction and by adding a feature point r=28 mm, and the derived diopter Power (r) is used as nonlinear multi-constraint conditions of the pattern search method. The astigmatism Cylinder(r) greater than 1.05 times of the diopter variation at the aperture of 30 mm is used as an objective function, and solutions of the cone coefficient k of the aspherical surface and the higher-order term coefficient $a_{2m}$ m=2, 3 . . . 8 of the aspherical surface are searched by using the pattern search method. An optimal solution is further obtained through the genetic algorithm optimization by using the solutions as initial values, and a radial variation curve of the absolute value of the diopter variation and the degree of astigmatism of the surface P is obtained as shown in FIG. 3. The degree of astigmatism at the aperture of 30 mm is 0.05879D, which is 1.081 times of the diopter variation of 0.05438D and is greater than 1.05. FIG. 4 shows a radial variation curve of a meridian diopter, a sagittal diopter, and a diopter of the surface P in this embodiment. As shown in FIG. 4, the diopter of the center is 0.75D. The surface diopter decreases from the center to the periphery, inflects at the aperture of 54 mm, and then increases. The sagittal diopter of the surface is greater than the meridian diopter, which indicates that an astigmatism axial direction of the surface P is the sagittal direction.

FIG. 1, FIG. 2, and FIG. 3 are a radial variation curve graph of an absolute value of a diopter variation and the degree of astigmatism of the surface W according to this embodiment, a radial variation curve graph of a meridian diopter, a sagittal diopter, and a diopter of the surface W, and a radial variation curve graph of an absolute value of a diopter variation and the degree of astigmatism of the surface P, respectively. As can be seen from FIGS. 1, 2, and 3, from the aperture of 20 mm to the aperture of 40 mm, the diopter variation of the surface W increases by about 0.5D, while the diopter variation of the surface P only increases by about 0.055D. A rate of diopter variation of the surface W is far greater than that of the surface P.

In this embodiment, the surface P is the front surface and the surface W is the back surface. According to theory in which parallel light is incident and imaged on a spherical surface at a far point of a retina, the center thickness of the lens of 1.2 mm is ignored, a refractive diopter value of a double-sided compound aspherical lens is obtained by subtraction between the diopter values of corresponding positions of the front and back surfaces, and the diopter value is negative, indicating that the double-sided compound aspherical lens is myopic eyeglasses. FIG. 5 shows a radial variation curve of a meridian diopter, a sagittal diopter, and a diopter of a double-sided compound aspherical myopic lens according to this embodiment. The diopter value of the lens increases along the radial direction, and the absolute value of the diopter decreases. That is, the negative diopter is reduced, and the meridian diopter is greater than the sagittal diopter. The meridian diopter and the sagittal diopter are subtracted to obtain the degree of astigmatism of the lens, and the astigmatism axial direction is a meridian direction. FIG. 6 shows a radial variation curve of the degree of astigmatism and a diopter variation of a lens. Because the astigmatism axial directions of the surface P and the surface W are consistent, the astigmatism offsets each other after subtraction, and the astigmatism of the lens composed of the surface P and the surface W is lower than that of the surface W. Specifically, the diopter variation at the aperture of 40 mm is 0.8541D, which is 0.142 times of the absolute value of the diopter of the center of −6D. At the aperture of 30 mm, the diopter variation is 0.5402D, and the degree of astigmatism of 0.4253D is 0.787 times of the diopter variation and is less than 0.80. At the aperture of 50 mm, the diopter variation is 1.189D, and the degree of astigmatism of 0.8078D is 0.679 times of the diopter variation and is less than 0.68.

Figures 7, 8, 9:
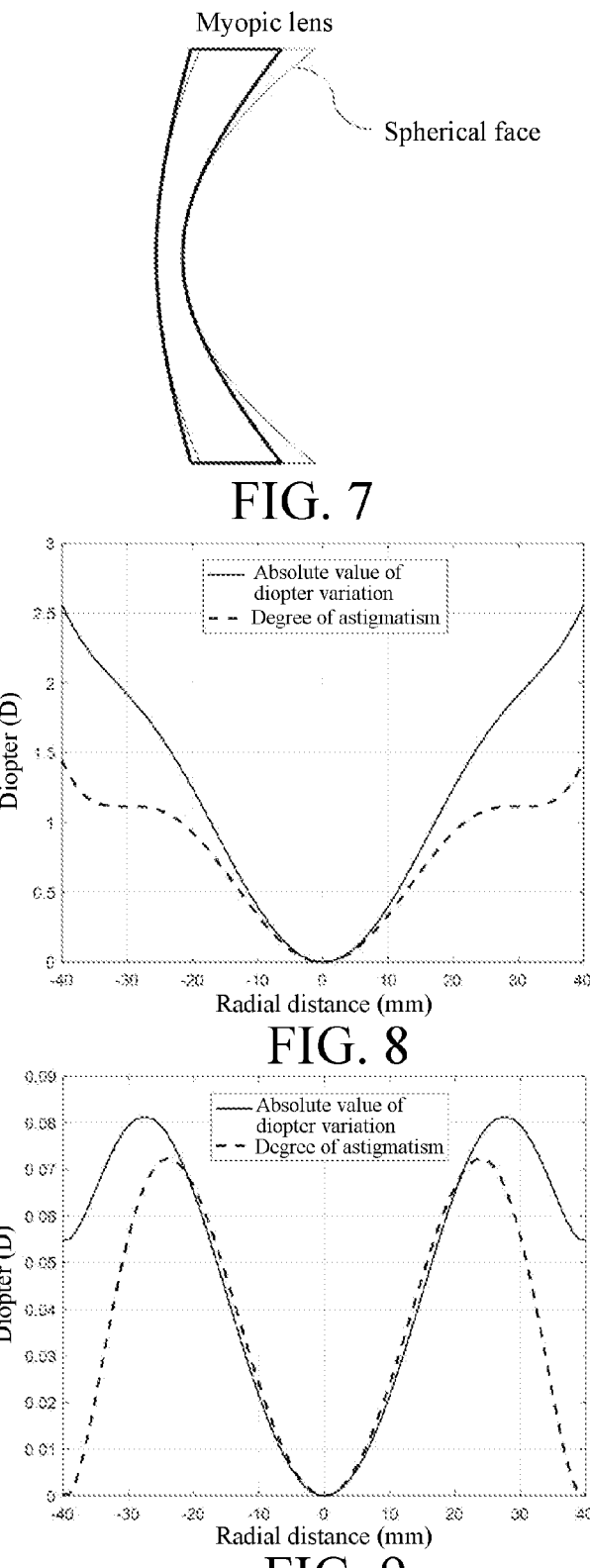
FIG. 7 is a schematic diagram of thinning of the double-sided compound aspherical myopic lens according to Embodiment 1 of the present disclosure.
FIG. 8 is a radial variation curve graph of an absolute value of the diopter variation and the degree of astigmatism of the surface W according to Embodiment 2 of the present disclosure.
FIG. 9 is a radial variation curve graph of an absolute value of the diopter variation and the degree of astigmatism of the surface P according to Embodiment 2 of the present disclosure.

The diopter of the front surface (the surface P) of the myopic lens decreases from the center to the periphery of the lens, and the lens is flattened. The diopter of the back surface (the surface W) of the lens also decreases from the center to the periphery of the lens, and the lens is flattened. In this measure, both the maximum diopters of the front and back surfaces are in the sagittal direction, and the astigmatism directions of the two surfaces are consistent, so that the astigmatism values are subtracted when the two surfaces are combined into the lens, and the astigmatism is eased. However, the flattening of the front surface is not conducive to thinning of the lens edge. This embodiment adopts two measures to achieve the goal of aesthetic thinning the lens. In one of the measures, a decrease rate of the diopter of the back surface (the surface W) from the center to the periphery of the lens is greater than that of the front surface. That is, a flattening speed of the surface is much greater than that of the front surface. In the other measure, an inflection point is designed at the aperture of 52-56 mm on the front surface (the surface P). From the inflection point to the edge, the diopter increases. That is, the flattening of the lens slows down, so that the combined myopic lens has a thinner edge. FIG. 7 shows a schematic diagram of thinning of the double-sided compound aspherical myopic lens.

Compared with a spherical lens with the same parameters (the same center diopter and the same refractive index of the front and back surfaces), an amount of thinning of the lens in this embodiment at an aperture of 70 mm is 0.835 mm, and a decrease value of edge thickness relative to the spherical lens is referred to as the amount of thinning. The comparison of the feature parameters: the diopter variation and the degree of astigmatism between the lens in this embodiment and a single-sided aspherical lens in which the diopter of the center of the front surface is 0.75D is as shown in Table 1. The data in Table 1 show that although the double-sided compound aspherical myopic lens designed by superposition easing on both surfaces has an increase in the diopter variation at the aperture of 40 mm on the premise of increasing the amount of thinning, the astigmatism is better than that of the conventional single-sided aspherical lens.

surface P as a working surface and a convex die holder having the surface W as a working surface.

Embodiment 2

A −6.00D double-sided aspherical myopic lens is designed. As in the Embodiment 1, the surface P with a center diopter of 0.75D is a front surface, and the surface W with a center diopter of 6.75D is a back surface. The lens has a refractive index of 1.56 and a center thickness of 1.2 mm.

Figures 10, 11, 12:
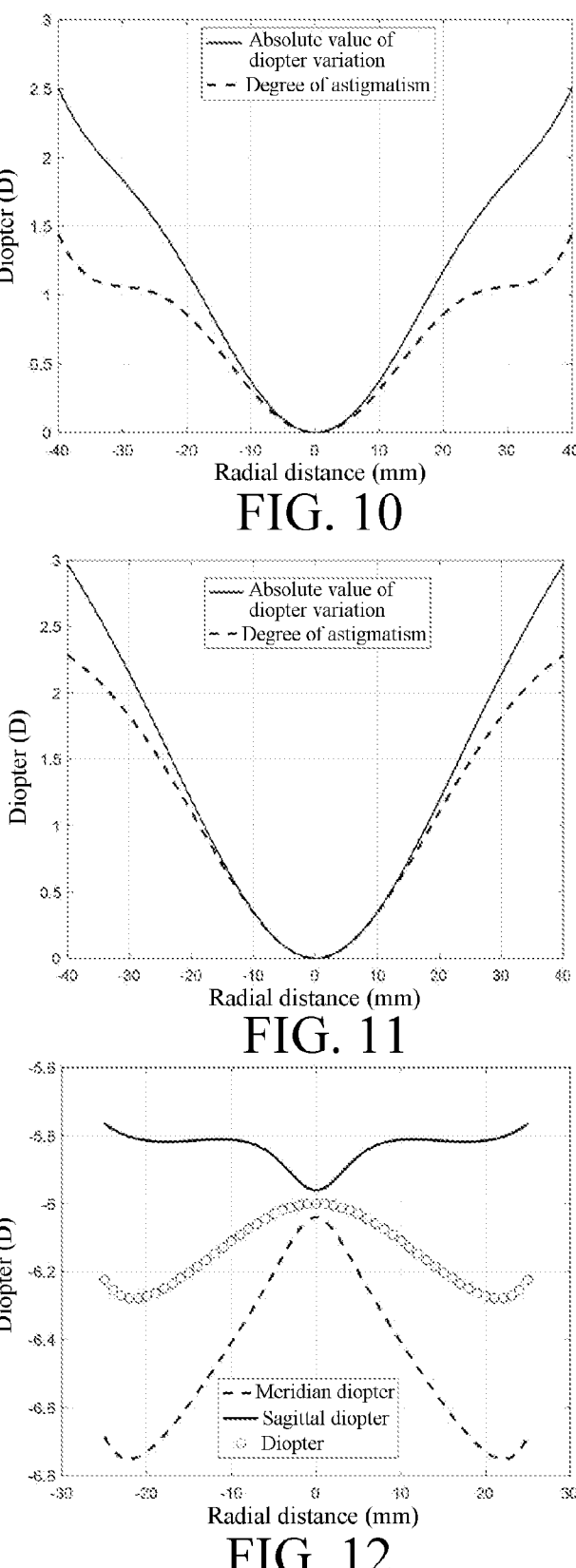
FIG. 10 is a radial variation curve graph of the diopter variation and the degree of astigmatism of the double-sided compound aspherical myopic lens according to Embodiment 2 of the present disclosure.
FIG. 11 is a radial variation curve graph of the diopter variation and the degree of astigmatism of a conventional double-sided aspherical lens according to Embodiment 2 of the present disclosure.
FIG. 12 is a horizontally radial variation curve graph of an oblique meridian diopter, an oblique sagittal diopter, and an oblique diopter of the double-sided compound aspherical myopic lens according to Embodiment 3 of the present disclosure.

Compared with Embodiment 1, the specific optimization setting is changed as follows: the diopter variation at the aperture of 40 mm of the surface W increases from 0.85D to 1.2D. The diopter value set every 5 mm along the r direction in pattern search is also adjusted accordingly, and the nonlinear multi-constraint conditions are also changed accordingly. The diopter variation at the aperture of 40 mm of the surface P is slightly reduced by 0.015D. A radial variation curve of the absolute value of the diopter variation and the degree of astigmatism of the surface W (the back surface) is designed as shown in FIG. 8. The absolute value of the diopter variation at the aperture of 40 mm is 1.234D, which is 0.182 times of the diopter of the center. The diopter decreases rapidly from the aperture of 50 mm to the edge. The degree of astigmatism is less than the diopter variation. At the aperture of 30 mm, the diopter variation is 0.8065D, and the degree of astigmatism of 0.6495D is 0.805 times of the diopter variation and is less than 0.85. At the aperture of 50 mm, the diopter variation is 1.625D, and the degree of astigmatism of 1.087D is 0.669 times of the diopter variation and is less than 0.72. These values conform to the feature requirements of the surface W. A radial variation curve of the absolute value of the diopter variation and the degree of astigmatism of the surface P (the front surface) is designed as shown in FIG. 9. There is an inflection point at an aperture of 54 mm. The degree of astigmatism at the aperture of 30 mm is 0.04703D, which is 1.082 times of the diopter variation of 0.04345D and is greater than 1.05. These values conform to the feature requirements of the surface P. A radial variation curve of the diopter variation and the degree of astigmatism of the double-sided compound aspherical lens is shown in FIG. 10. Specific data is that the diopter variation at the aperture of 40 mm is 1.179D, which is 0.197 times of the absolute value of the central diopter of −6D. At the

TABLE 1

| | Amount (mm) of thinning at aperture of 70 mm | Diopter variation (D) at aperture of 40 mm | Degree (D) of astigmatism at aperture of 30 mm | Degree (D) of astigmatism at aperture of 40 mm |
|---|---|---|---|---|
| Double-sided aspherical spectacle lens in Embodiment 1 | 0.854 | 0.854 | 0.425 | 0.634 |
| Conventional single-sided aspherical spectacle lens | 0.8 | 0.75 | 0.44 | 0.65 |

The double-sided composite spectacle lens designed in this embodiment is directly solidified and molded by casting a resin lens through a glass mold or by casting a semi-finished product through back surface grinding. The glass mold comprises a die holder P and a die holder W. A double-sided compound aspherical myopic spectacle lens is cast by a mold composed of a concave die holder having the aperture of 30 mm, the diopter variation is 0.763D, and the degree of astigmatism of 0.6025 is 0.790 times of the diopter variation and is less than 0.80. At the aperture of 50 mm, the diopter variation is 1.546D, and the degree of astigmatism of 1.015D is 0.657 times of the diopter variation and is less than 0.68. The feature requirements of the lens in this embodiment are met.

A radial variation curve of the diopter variation and the degree of astigmatism of a conventional double-sided aspherical lens having the same amount of thinning at the aperture of 70 mm as this embodiment is shown in FIG. 11. The comparison of corresponding feature parameters is shown in Table 2.

TABLE 2

|  | Amount (mm) of thinning at aperture of 70 mm | Diopter variation (D) at aperture of 40 mm | Degree (D) of astigmatism at aperture of 30 mm | Degree (D) of astigmatism at aperture of 40 mm |
|---|---|---|---|---|
| Double-sided aspherical spectacle lens in Embodiment 2 | 1.11 | 1.179 | 0.603 | 0.862 |
| Conventional single-sided aspherical spectacle lens | 1.10 | 1.193 | 0.704 | 1.104 |

In this embodiment, the double-sided compound aspherical myopic lens designed by superposition easing on both surfaces has the same amount (1.1 mm) of thinning at the aperture of 70 mm as the conventional double-sided aspherical lens. However, the diopter variation at the aperture of 40 mm and the degrees of astigmatism at the apertures of 30 mm and 40 mm are all less than those of the conventional double-sided aspherical lens. The performance is better than that of the conventional single-sided aspherical lens in both the center viewing field area and the peripheral oblique viewing area.

A glass mold for the double-sided composite spectacle lens provided by this embodiment is composed of a concave die holder having the surface P as a working surface and a convex die holder having the surface W as a working surface. The double-sided compound aspherical myopic spectacle lens is directly solidified and molded by casting a resin lens through the mold.

Embodiment 3

A ray trace is calculated by using the method provided in Chinese disclosure patent CN106526890B according to default values that a lens-to-eye distance is 12 mm, a distance between a spherical surface at a far point of a retina and a vertex of an eyeball is 13 mm, and a vertical inclination angle of an eyeglass frame is 9 degrees. The oblique diopter, oblique astigmatism, astigmatism, and field curvature of the −6.00D double-sided compound aspherical myopic lens within an aperture of 50 mm (angle of view of about 45 degrees) provided in Embodiment 1 are compared with the oblique astigmatism, astigmatism, and field curvature of the spherical lens formed by the same material and the same center diopters of the front and back surfaces.

Figures 13, 14, 15:
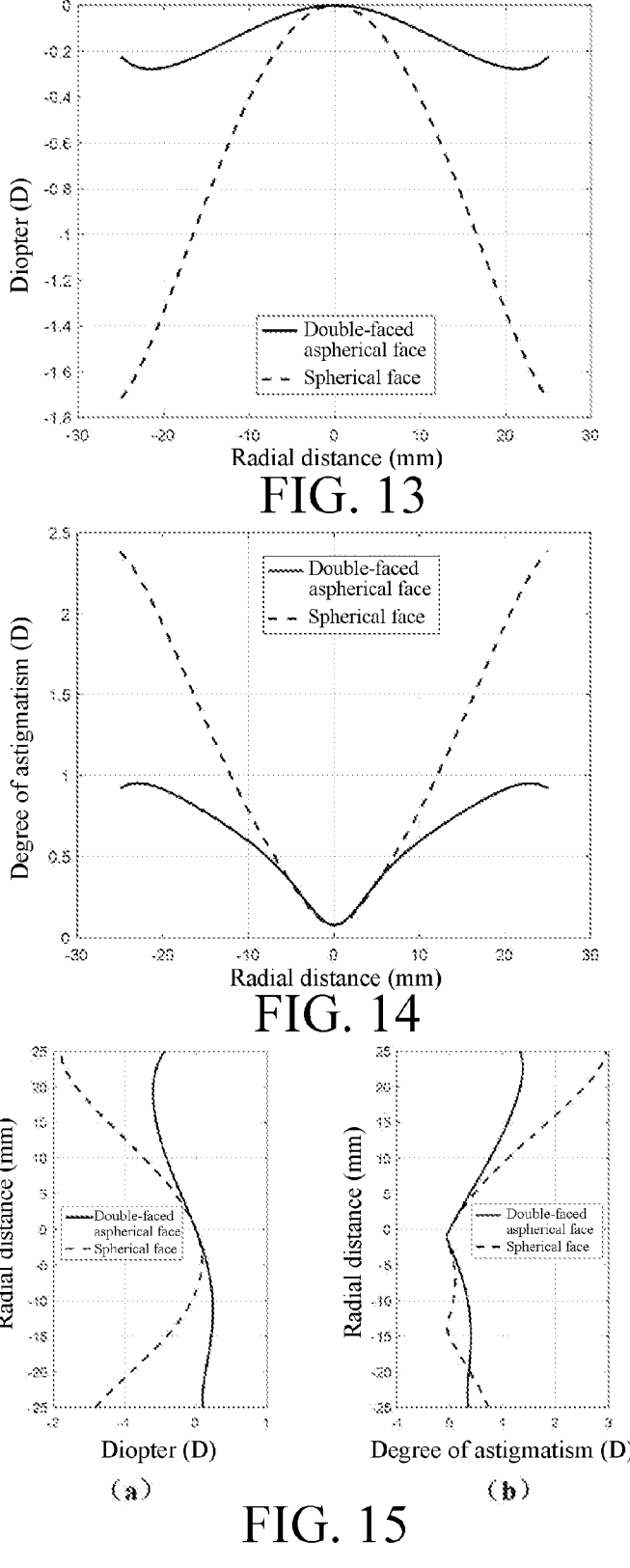
FIG. 13 is a horizontally radial variation curve graph of an oblique diopter variation of the double-sided compound aspherical myopic lens and an oblique diopter variation of a spherical lens with the same parameters according to Embodiment 3 of the present disclosure.
FIG. 14 is a horizontally radial variation curve graph of the degree of oblique astigmatism of the double-sided compound aspherical myopic lens and the degree of oblique astigmatism of a spherical lens with the same parameters according to Embodiment 3 of the present disclosure.
FIG. 15 is a vertically radial variation curve graph of the oblique diopter variation and the degree of oblique astigmatism of the double-sided compound aspherical myopic lens and the oblique diopter variation and the degree of oblique astigmatism of the spherical lens with the same parameters according to Embodiment 3 of the present disclosure.

The calculated horizontally radial oblique diopter is shown in FIG. 12, which is greatly different from the diopter of the same lens shown in FIG. 5. From the center to the periphery, an oblique sagittal diopter decreases, an oblique meridian diopter increases, the value of the oblique diopter decreases, and the absolute value of the diopter (oblique negative diopter) increases. Because the lens is inclined vertically outward, astigmatism also exists in the center of the lens. FIG. 13 and FIG. 14 are horizontally radial curve graphs of an oblique diopter variation and oblique astigmatism respectively. In the figures, a solid curve corresponds to the double-sided compound aspherical myopic lens, and a dotted curve corresponds to the spherical lens composed of the front and back surfaces with the same center diopter. As can be seen from FIG. 13, an oblique diopter of the spherical lens with a constant diopter decreases a lot, and an oblique diopter variation reaches 1.8D. The increased surface diopter of the double-sided compound aspherical lens in which the diopter increases along the radial direction offsets the decrease of the oblique diopter, so that the oblique diopter variation of the double-sided compound aspherical lens is kept within 0.3D, which is quite stable. The maximum degree of oblique astigmatism of the double-sided compound aspherical lens is 0.877D at an aperture of 46 mm. However, the degree of oblique astigmatism of the spherical lens increases linearly with the increase of an angle of view and reaches 2.309D at an aperture of 59 mm. A vertically radial curve graph of an oblique diopter variation and oblique astigmatism are shown in FIG. 15(a) and FIG. 15(b) respectively. FIG. 15(a) is a vertically radial variation curve graph of an oblique diopter variation of a double-sided compound aspherical myopic lens and an oblique diopter variation of the spherical lens with the same parameters according to this embodiment. FIG. 15(b) is a vertically radial variation curve graph of the degree of oblique astigmatism of a double-sided compound aspherical myopic lens and the degree of oblique astigmatism of the spherical lens with the same parameters according to this embodiment.

Figures 16, 17, 18:
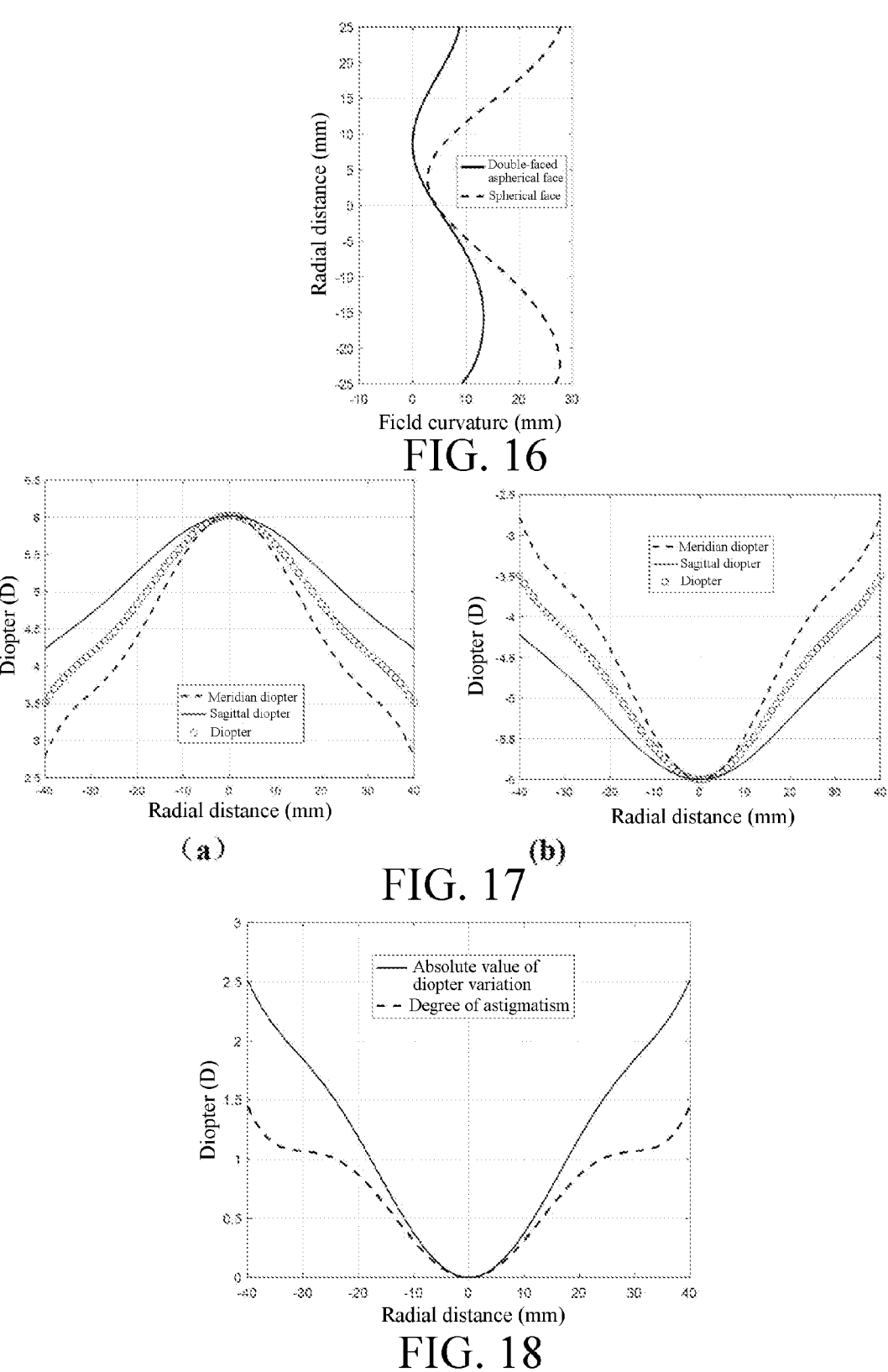
FIG. 16 is a vertically radial variation curve graph of a field curvature of the double-sided compound aspherical myopic lens and a field curvature of the spherical lens with the same parameters according to Embodiment 3 of the present disclosure.
FIG. 17 shows a radial variation curve of the meridian diopter, the sagittal diopter, and the diopter of the double-sided compound aspherical hyperopic lens according to Embodiment 4 and Embodiment 2 of the present disclosure.
FIG. 18 is a radial variation curve graph of an absolute value of the diopter variation and the degree of astigmatism of the double-sided compound aspherical hyperopic lens according to Embodiment 4 of the present disclosure.

Because of the outward tilt of the lens, the oblique diopter variation and the oblique astigmatism in the vertical direction are asymmetrical. Within the aperture of 50 mm, the fluctuation of the oblique diopter variation of the double-sided compound aspherical lens is less than 0.677D, and the maximum degree of oblique astigmatism is 1.38D. The maximum oblique diopter variation of the spherical lens is −1.884D, and the maximum degree of oblique astigmatism is 2.923D. A vertically radial variation curve of a field curvature is shown in FIG. 16. A solid line is the field curvature of the double-sided compound aspherical myopic lens, and the maximum field curvature within the aperture of 50 mm is 13.28 mm, while the maximum field curvature (dotted line) of the spherical lens with the same parameters is 27.75 mm.

The results show that the adaptability and comfort to wear the double-sided compound aspherical lens are significantly superior to those of the spherical lens.

Embodiment 4

This embodiment provides a −6.00D double-sided compound aspherical hyperopic lens. The surface W with a center diopter of 6.75D is a front surface, and the surface P with a center diopter of 0.75D is a back surface. The lens has a refractive index of 1.56 and a center thickness of 5.88 mm.

Figures 19, 20, 21:
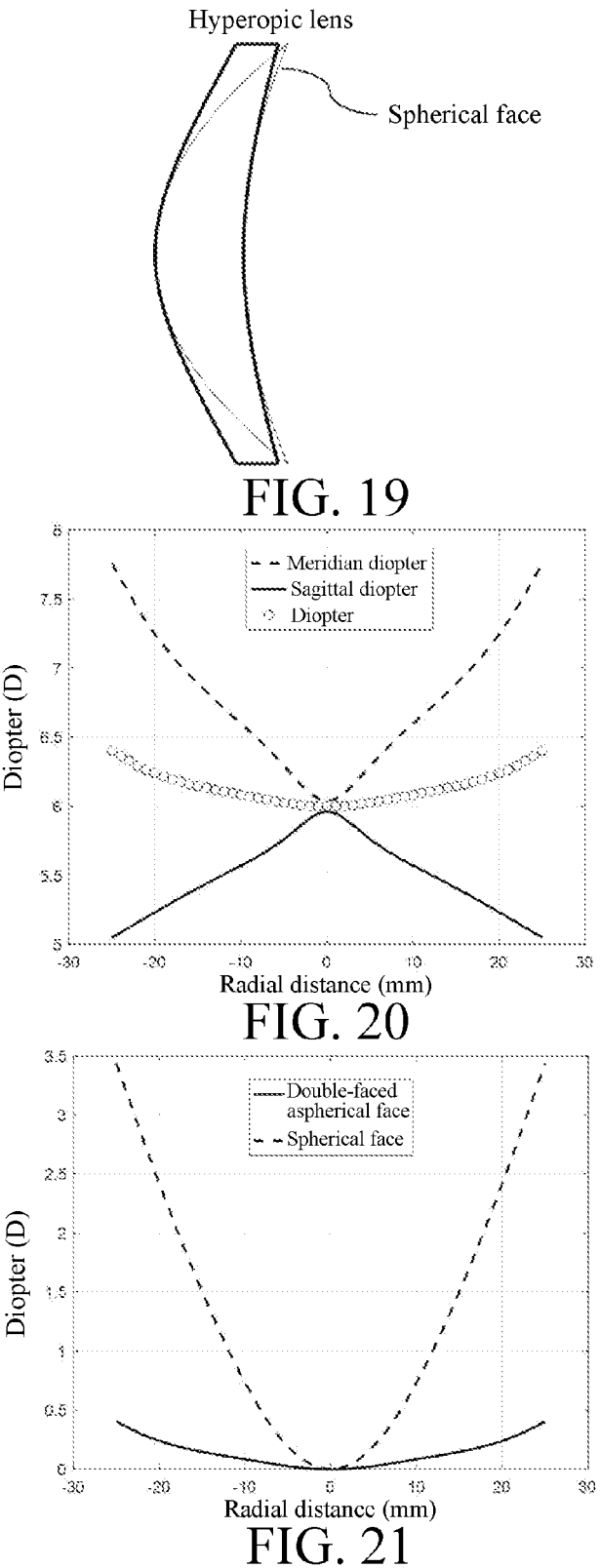
FIG. 19 is a schematic diagram of aesthetic thinning of the double-sided compound aspherical hyperopic lens according to Embodiment 4 of the present disclosure.
FIG. 20 is a horizontally radial variation curve graph of an oblique meridian diopter, an oblique sagittal diopter, and an oblique diopter of the double-sided compound aspherical hyperopic lens according to Embodiment 4 of the present disclosure.
FIG. 21 is a horizontally radial variation curve graph of an oblique diopter variation of the double-sided compound aspherical hyperopic lens and an oblique diopter variation of the spherical lens with the same parameters according to Embodiment 4 of the present disclosure.

The surface P and the surface W are designed according to the technical solution of Embodiment 2. FIG. 17 shows a radial variation curve of a meridian diopter, a sagittal diopter, and a diopter of the double-sided compound aspherical hyperopic lens according to this embodiment and Embodiment 2. A radial variation curve of the diopter of the double-sided compound aspherical hyperopic lens formed in this embodiment is shown in FIG. 17(*a*), which is different from a radial variation curve of the diopter of the double-sided compound aspherical myopic lens in Embodiment 2 shown in FIG. 17(*b*) only in that the diopter of the center varies from −5.996 to 6.019D, the diopter decreases along the radial direction, and the meridian diopter is greater than the sagittal diopter. However, the variation patterns along the radial direction thereof are the same, and a radial variation graph (FIG. 18) of an absolute value of a diopter variation and the degree of astigmatism are identical to the variation graph (FIG. 10) in Embodiment 2. Since a decrease rate of the diopter of the front surface (the surface W) is far greater than that of the back surface (the surface P), the edge thickness of the double-sided compound aspherical hyperopic lens increases. A schematic diagram of increase of edge thickness is shown in FIG. 19. By adopting the technical solution of this embodiment, the center thickness can be reduced under the condition that the edge thickness reaches 1 mm or 1.5 mm, thereby reducing the weight of the spectacle lens. Under the condition that the edge thickness is 1.5 mm at an aperture of 60 mm, the center thickness of the spherical lens composed of the front and back surfaces with the same center diopter reaches 6.51 mm, while the center thickness of the hyperopic lens in this embodiment can be reduced to 5.88 mm by 0.63 mm.

Figures 22, 23, 24:
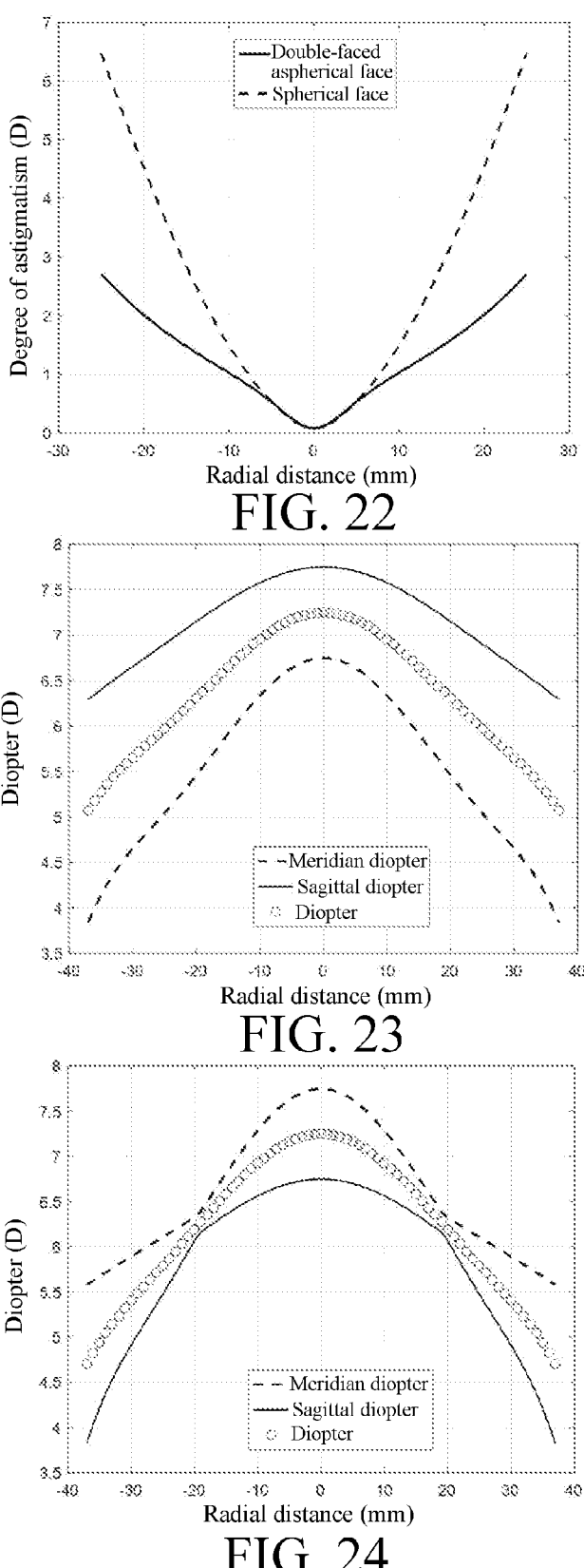
FIG. 22 is a horizontally radial variation curve graph of the degree of oblique astigmatism of the double-sided compound aspherical hyperopic lens and the degree of oblique astigmatism of the spherical lens with the same parameters according to Embodiment 4 of the present disclosure.
FIG. 23 shows a radial variation curve of the meridian diopter, the sagittal diopter, and the diopter of an atoric surface in the spherical lens direction according to Embodiment 5 of the present disclosure.
FIG. 24 shows a radial variation curve of the meridian diopter, the sagittal diopter, and the diopter of the atoric surface in a cylindrical lens direction according to Embodiment 5 of the present disclosure.

A horizontally radial variation curve graph of an oblique meridian diopter, an oblique sagittal diopter, and an oblique diopter of the double-sided compound aspherical hyperopic lens are shown in FIG. 20. A horizontally radial variation curve graph of an oblique diopter variation and an oblique diopter variation of the spherical lens with the same parameters is shown in FIG. 21. A horizontally radial variation curve graph of the degree of oblique astigmatism and the degree of oblique astigmatism of the spherical lens with the same parameters is shown in FIG. 22. The oblique meridian diopter is greater than the oblique sagittal diopter relative to the myopic lens composed of the surface P and the surface W plane in Embodiment 2, which is of the same design. Since the center thickness of a spherical hyperopic lens with the same diopter is greater than that of the double-sided compound aspherical hyperopic lens designed in this embodiment, the oblique diopter of the spherical hyperopic lens deviates from the diopter of the center by 3.44D within the aperture of 50 mm, and the oblique astigmatism reaches 6.40D. However, the corresponding values of the double-sided compound aspherical hyperopic lens designed in this embodiment are only 0.40D and 2.63D respectively, and the performance thereof is far better than that of the spherical lens.

The double-sided composite spectacle lens designed in this embodiment is directly solidified and molded by casting a resin lens through a glass mold or by casting a semi-finished product through back surface grinding. The glass mold comprises a die holder P and a die holder W. The double-sided compound aspherical hyperopic spectacle lens is cast by a mold composed of a concave die holder having the surface W as a working surface and a convex die holder having the surface P as a working surface.

Embodiment 5

This embodiment provides an astigmatic myopic lens having a spherical power of −6D and a cylindrical power of −1D. A front surface is an aspherical surface and has a center diopter of 0.75D, and the surface P is used as the front surface based on the design method provided in Embodiment 2. A back surface is an atoric surface which is designed to have a diopter of 6.75D in a spherical lens direction and a diopter of 7.75D in a cylindrical lens direction.

Radial variations of a meridian diopter, a sagittal diopter, and a diopter of the atoric surface in the spherical lens direction and in the cylindrical lens direction are shown in FIG. 23 and FIG. 24, respectively. As can be seen from the figures, due to the design of the cylindrical power of −1D, there is a difference of 1D between the meridian diopter and the sagittal diopter at the center of an atoric curved lens. The meridian diopter is less than the sagittal diopter along the radial direction in the spherical lens direction, and the meridian diopter is greater than the sagittal diopter along the radial direction in the cylindrical lens direction. Because the meridian diopter along the radial direction in the spherical lens direction is perpendicular to that in the cylindrical lens direction, the astigmatism directions in the spherical lens direction and in the cylindrical lens direction are consistent. The diopter in the spherical lens direction and the cylindrical lens direction decreases along the radial direction, and decreases rapidly from an aperture of 50 mm to the edge. In the spherical lens direction, a center diopter is 7.248D, the diopter at an aperture of 40 mm is 6.341, and an absolute value of a variation is 0.907D, which is 0.125 times of the diopter of the center of 7.248D. In the cylindrical lens direction, the diopter of the center is 7.248D, the diopter at the aperture of 40 mm is 6.22D, and the absolute value of the variation is 1.028D, which is 0.142 times of the diopter of the center of 7.248D. The absolute value of the diopter variation at the aperture of 40 mm in the spherical lens direction is 0.907D, which is 0.882 times of the absolute value (1.028D) of the diopter variation in the cylindrical lens direction.

Figures 25, 26, 27:
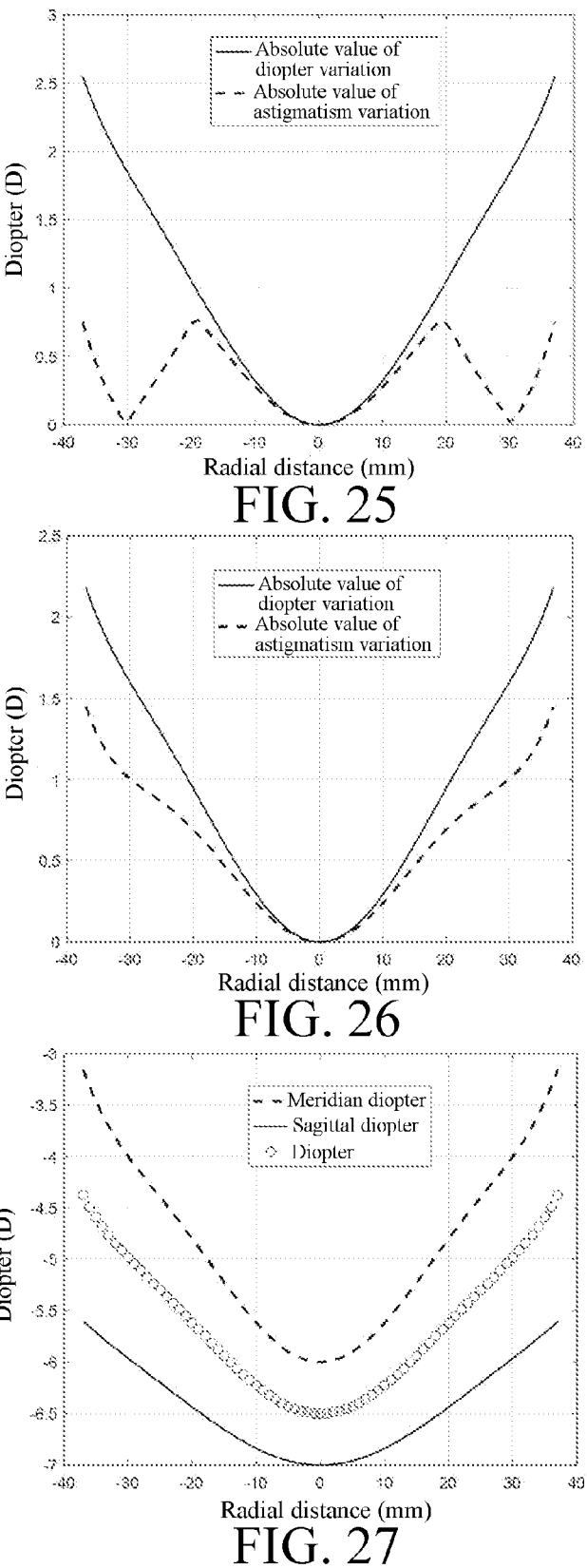
FIG. 25 is a radial variation curve graph of an absolute value of the diopter variation and an absolute value of an astigmatism variation of the atoric surface in a cylindrical lens direction according to Embodiment 5 of the present disclosure.
FIG. 26 is a radial variation curve graph of an absolute value of the diopter variation and an absolute value of an astigmatism variation of the atoric surface in the spherical lens direction according to Embodiment 5 of the present disclosure.
FIG. 27 shows a horizontally radial variation curve of the meridian diopter, the sagittal diopter, and the diopter of the double-sided compound astigmatic myopic lens in the spherical lens direction according to Embodiment 5 of the present disclosure.
Figures 28, 29, 30:
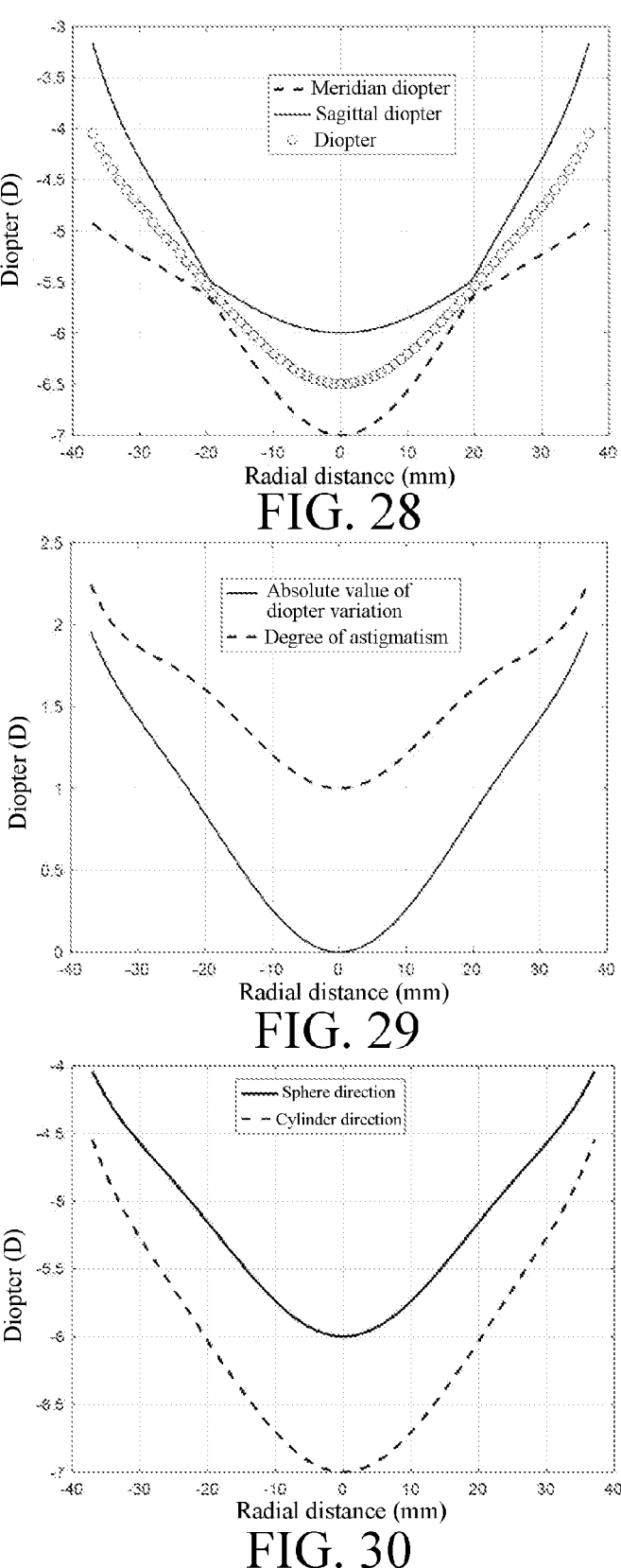
FIG. 28 shows a radial variation curve of the meridian diopter, the sagittal diopter, and the diopter of the double-sided compound astigmatic myopic lens in a cylindrical lens direction according to Embodiment 5 of the present disclosure.
FIG. 29 shows a radial variation curve of an absolute value of the diopter variation and the degree of astigmatism of the double-sided compound astigmatic myopic lens in the spherical lens direction according to Embodiment 5 of the present disclosure.
FIG. 30 is a radial variation curve graph of the diopter of the double-sided compound astigmatic myopic lens in the spherical lens direction and in the cylindrical lens direction according to Embodiment 5 of the present disclosure.

FIG. 25 and FIG. 26 are radial variation curve graphs of an absolute value of a diopter variation and an absolute value of an astigmatism variation of the atoric surface in the cylindrical lens direction and in the spherical lens direction, respectively. As can be seen from the figures, the astigmatism variation is less than the absolute value of the diopter variation. In the cylindrical lens direction, at an aperture of 30 mm, the absolute value of the diopter variation is 0.6477D, and the degree of astigmatism of 0.5407D is 0.835 times of the absolute value of the diopter variation and is less than 0.85. At the aperture of 50 mm, the absolute value of the diopter variation is 1.429D, and the degree of astigmatism of 0.3767D is 0.264 times of the absolute value of the diopter variation. In the spherical lens direction, at the aperture of 30 mm, the absolute value of the diopter variation is 0.5766D, and the degree of astigmatism of 0.4480D is 0.777 times of the absolute value of the diopter variation and is less than 0.85. At the aperture of 50 mm, the absolute value of the diopter variation is 1.221D, and the degree of astigmatism of 0.8060D is 0.660 times of the absolute value of the diopter variation. Horizontally radial variation curves of a meridian diopter, a sagittal diopter, and a diopter of a double-sided compound astigmatic myopic lens composed of the atoric surface and an aspherical surface in the spherical lens direction and in the cylindrical lens direction are shown in FIG. 27 and FIG. 28, respectively. The diopter of the center is −6.498D, the meridian diopter is −5.998D, and the sagittal diopter is −6.998D. That is, the lens is an astigmatic myopic lens having a spherical power of −6D and a cylindrical power of −1D. In the cylindrical lens direction, the diopter of the center is −6.498D, and increases to −5.532D at the aperture of 40 mm, and the diopter variation is 0.966D, which is 0.149 of the absolute value of the diopter of the center. In the spherical lens direction, the diopter of the center is −6.498D, and increases to −5.653D at the aperture of 40 mm, and the diopter variation is 0.845D, which is 0.130 of the absolute value of the diopter of the center. The diopter variation at the aperture of 40 mm in the spherical lens direction is 0.845D, which is 0.875 times of the diopter variation of 0.966D in the cylindrical lens direction.

A radial variation curve of an absolute value of a diopter variation and the degree of astigmatism in the spherical lens direction is shown in FIG. 29. The astigmatism variation is obviously less than the absolute value of the diopter variation. At the aperture of 30 mm, the absolute value of the diopter variation is 0.5352D, and the astigmatism variation of 0.409D is 0.764 times of the absolute value of the diopter variation and is less than 0.80. At the aperture of 50 mm, the absolute value of the diopter variation is 1.145D, and the astigmatism variation of 0.750D is 0.655 times of the absolute value of the diopter variation and is less than 0.68. A radial variation curve of a diopter in the spherical lens direction and in the cylindrical lens direction is shown in FIG. 30. Along the radial direction, the decrease of the diopter in the spherical lens direction is significantly smaller than that in the cylindrical lens direction. Through calculations, the difference of diopter compensation values in the spherical lens direction and the cylindrical lens direction reduces the inherent edge thickness difference of the astigmatic lens by 0.22 mm.

A mold for the double-sided compound astigmatic myopic spectacle lens provided in this embodiment is a glass mold for casting a resin lens. The mold comprises a concave die holder with an aspherical surface as a working surface and a convex die holder with an atoric surface as a working surface.

What is claimed is:

1. A double-sided composite spectacle lens, comprising an aspherical surface P and an aspherical surface W, a center curvature of the surface P being less than that of the surface W, wherein an absolute value of a diopter of the spectacle lens decreases gradually from a center to a periphery of the spectacle lens, and an absolute value of a diopter variation of the spectacle lens is 0.10-0.20 times of the absolute value of the diopter of the center of the spectacle lens at an aperture of 40 mm of the spectacle lens; a difference between the absolute value of the diopter variation and a degree of astigmatism of the spectacle lens increases gradually from the center to the periphery of the spectacle lens; the degree of astigmatism of the spectacle lens is less than the absolute value of the diopter variation of the spectacle lens at each point of the spectacle lens, the degree of astigmatism of the spectacle lens is less than 0.80 times of the absolute value of the diopter variation of the spectacle lens at the aperture of 30 mm of the spectacle lens, and the degree of astigmatism of the spectacle lens is less than 0.68 times of the absolute value of the diopter variation of the spectacle lens at the aperture of 50 mm of the spectacle lens;

a diopter of the surface P decreases at a uniform speed and then increase from the center to the periphery with an inflection point occurring in the aperture of 52-56 mm, and the degree of astigmatism of the surface P is greater than 1.05 times of the absolute value of the diopter variation of the surface P at the aperture of 30 mm;

a rate of variation of the diopter of the surface W is greater than a rate of variation of the diopter of the surface P, the diopter of the surface W decreases gradually at a uniform speed from the center to the aperture of 50 mm, a decrease rate of the diopter of the surface W increases from the aperture of 50 mm to the periphery, and the absolute value of the diopter variation of the surface W at the aperture of 40 mm is 0.10-0.20 times of the diopter of the center of the surface W; and the degree of astigmatism of the surface W is less than the absolute value of the diopter variation of the surface W at each point of the surface W, the degree of astigmatism of the surface W is less than 0.85 times of the absolute value of the diopter variation of the surface W at the aperture of 30 mm, and the degree of astigmatism of the surface W is less than 0.72 times of the absolute value of the diopter variation of the surface W at the aperture of 50 mm.

2. The double-sided composite spectacle lens according to claim 1, wherein a double-sided compound aspherical myopic spectacle lens is formed by using the aspherical surface P as a front surface and the aspherical surface W as a back surface.

3. The double-sided composite spectacle lens according to claim 1, wherein a double-sided compound aspherical hyperopic spectacle lens is formed by using the aspherical surface W as a front surface and the aspherical surface P as a back surface.

4. A mold for preparing the double-sided composite spectacle lens according to claim 1, the mold being a glass mold for casting a resin lens, comprising:

a concave die holder having a working surface which is one of the aspherical surface P and the aspherical surface W; and a convex die holder having a working surface which is the other of the aspherical surface P or the aspherical surface W.

5. A double-sided compound astigmatic spectacle lens, comprising: an aspherical surface and an atoric surface, a center curvature of the aspherical surface being less than that of the atoric surface, wherein an absolute value of a diopter of the spectacle lens decreases gradually from a center to a periphery of the spectacle lens; an absolute value of a diopter variation of the spectacle lens in a cylindrical lens direction is 0.10-0.20 times of the absolute value of the diopter of the center of the spectacle lens in the cylindrical lens direction at an aperture of 40 mm of the spectacle lens, the absolute value of the diopter variation of the spectacle lens in a spherical lens direction is 0.09-0.18 times of the absolute value of the diopter of the center of the spectacle lens in the spherical lens direction, and the absolute value of the diopter variation of the spectacle lens in the spherical lens direction is lower than 0.9 times of the absolute value of the diopter variation of the spectacle lens in the cylindrical lens direction;

an astigmatism variation of the spectacle lens is less than the absolute value of the diopter variation of the spectacle lens at each point of the spectacle lens, the astigmatism variation of the spectacle lens is less than 0.8 times of the absolute value of the diopter variation of the spectacle lens at the aperture of 30 mm of the spectacle lens, and the astigmatism variation of the spectacle lens is less than 0.68 times of the absolute value of the diopter variation of the spectacle lens at the aperture of 50 mm of the spectacle lens;

a diopter of the aspherical surface decreases at a uniform speed and then increase from the center to the periphery with an inflection point occurring in the aperture of 52-56 mm, and the degree of astigmatism of the aspherical surface is greater than 1.05 times of the absolute value of the diopter variation of the aspherical surface at the aperture of 30 mm;

a rate of variation of the diopter of the atoric surface is greater than that of the diopter of the aspherical surface, the diopter of the atoric surface decreases at a uniform speed from the center to the aperture of 50 mm, and a decrease rate of the diopter of the atoric surface increases from the aperture of 50 mm to the periphery; and at an aperture of 40 mm, the absolute value of the diopter variation of the atoric surface in the cylindrical lens direction is 0.10-0.20 times of the diopter of the center of the atoric surface in the cylindrical lens direction, the absolute value of the diopter variation of the atoric surface in the spherical lens direction is 0.09-0.18 times of the absolute value of the diopter of the center of the atoric surface in the spherical lens direction, and the absolute value of the diopter variation of the atoric surface in the spherical lens direction is lower than 0.9 times of the absolute value of the diopter variation of the atoric surface in the cylindrical lens direction; and an astigmatism variation of the atoric surface is less than the absolute value of the diopter variation of the atoric surface at each point of the atoric surface, the astigmatism variation of the atoric surface is less than 0.85 times of the absolute value of the diopter variation of the atoric surface at the aperture of 30 mm, and the astigmatism variation of the atoric surface is less than 0.72 times of the absolute value of the diopter variation of the atoric surface at the aperture of 50 mm.

6. The double-sided compound astigmatic spectacle lens according to claim 5, wherein a double-sided compound astigmatic myopic spectacle lens is formed by using the aspherical surface as a front surface and the atoric surface as a back surface.

7. The double-sided compound astigmatic spectacle lens according to claim 5, wherein a double-sided compound astigmatic hyperopic spectacle lens is formed by using the atoric surface as a front surface and the aspherical surface as a back surface.

8. A mold for preparing the double-sided compound astigmatic spectacle lens according to claim 5, the mold being a glass mold for casting a resin lens, comprising:

a concave die holder having a working surface which is one of the aspherical surface and the atoric surface; and a convex die holder having as a working surface which is the other of the aspherical surface and the atoric surface.

* * * * *